(12) United States Patent
Annis et al.

(10) Patent No.: US 7,218,028 B2
(45) Date of Patent: May 15, 2007

(54) BRUSH HOLDER ASSEMBLY FOR DYNAMOELECTRIC MACHINES

(75) Inventors: Joan Ione Annis, Schenectady, NY (US); Thomas Edwin VanSchaick, Saratoga, NY (US); Anthony Rigosu, Albany, NY (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 11/002,433

(22) Filed: Dec. 3, 2004

(65) Prior Publication Data

US 2006/0119211 A1 Jun. 8, 2006

(51) Int. Cl.
*H01R 29/42* (2006.01)
(52) U.S. Cl. .................. 310/240; 310/244; 310/246
(58) Field of Classification Search ........... 310/239, 310/240, 242, 244–247
See application file for complete search history.

(56) References Cited

U.S. PATENT DOCUMENTS

| | | | |
|---|---|---|---|
| 1,277,394 A * | 9/1918 | Dean ..................... 310/246 |
| 3,521,102 A * | 7/1970 | Sen ....................... 310/246 |
| 3,710,478 A | 1/1973 | Krulls et al. |
| 3,864,803 A | 2/1975 | Ohmstedt et al. |
| 4,296,346 A | 10/1981 | Ooki et al. |
| 4,329,683 A * | 5/1982 | Kimberlin ............. 340/679 |
| 4,366,404 A | 12/1982 | Ziegler |
| 4,663,552 A | 5/1987 | Ohmstedt |
| 5,043,619 A * | 8/1991 | Kartman, Jr. .......... 310/242 |

* cited by examiner

*Primary Examiner*—Dang Le
(74) *Attorney, Agent, or Firm*—Nixon & Vanderhye P.C.

(57) ABSTRACT

A brush holder assembly that cannot be assembled incorrectly includes a brush inserted into a brush holder, a block attached to the top of the brush, a spring engaging the block that applies radial pressure to the block and brush, and a hook pin that holds the spring onto the block. The block includes a semicircular indentation that cradles a coiled portion of the spring and includes a slotted hole for receiving a portion of the hook pin as the block is glued to the top of the brush. The hook pin is a loop terminating at a first end that is a straight pin and terminating at a second end that is a hook-shaped loop in which the straight pin end is inserted. Alternatively, a U-shaped spool assembly can be used to engage the coiled portion of the spring to lock it in the indentation in the block.

27 Claims, 4 Drawing Sheets

BRUSH HOLDER ASSEMBLY FOR DYNAMOELECTRIC MACHINES

BACKGROUND OF THE INVENTION

The present invention relates to dynamoelectric machines, and in particular, to an improved brush holder assembly that cannot be assembled incorrectly and that can be safely released, retracted, and replaced, while maintaining machine operation.

In dynamoelectric machines, a brush holder assembly transfers current from a stationary brush to a rotating contact, such as a slip ring, which then supplies excitation power to a dynamoelectric machine. The brush is mounted in a brush box, and is slidable radially inward toward the surface of the rotating contact. The brush is maintained on the rotating surface of the slip ring by means of a constant pressure spring mounted on a brush holder. Under spring pressure, the brush wears down and requires replacement for maintenance. Power industry expectation developed over the last 20 years is that worn bush assemblies must be able to be removed while a machine is running and under voltage.

Brush holder assemblies are generally characterized as single brush holder assemblies and magazine or multiple brush holder assemblies. Two patents that disclose prior single cartridge, brush replacement assemblies are U.S. Pat. No. 3,710,478 issued to Krulls in 1973 and U.S. Pat. No. 3,864,803 issued to Ohmstedt in 1975. The Ohmstedt brush assembly is shown in FIG. 1. It includes inwardly biased brush holder legs 4 that are spread apart to allow clamping ramps 5 to release and permit the brush 2 to "float" while in an operational mode. Then for retraction, the legs 4 are released so that the brush 2 can be clamped and removed.

The brush holder assembly shown in FIG. 1 has been, because of reliability, safety, and high cost issues associated with the clamping ramps 5 and legs 4, replaced by the brush assembly shown in FIG. 2. In the brush assembly shown in FIG. 2, the clamping ramp 5 feature for retraction is eliminated in favor of a spool 6 and clip 3 arrangement.

Currently, there are at least three brush holder assemblies that allow worn brush assemblies to be removed while a unit is operating. The brush assembly for single brush holders shown in FIG. 2 has evolved over the past 20 years and has a good reliability record. However, as the power utility industry has become more safety conscious in recent years, complaints have occurred with respect to the flexibility of the brush handle and worn brush assembly during the brush removal process. In addition, as new and inexperienced brush holder suppliers have begun supplying parts, it is now apparent that the brush holder assembly shown in FIG. 2 is not "mistake proof". For example, a number of instances have occurred where the clip 3 has been installed backwards 180 degrees with respect to the brush 2, causing the clip 3 to hang up on the brush holder 1 at the point of interference 4 shown in FIG. 2, as the brush wears down and clip 3 moves down toward holder 1. The backward installation of clip 3 has lead to a flashover or loss of electrical contact situation between the brush 2 and the slip ring on an operating machine, leading to a forced shutdown of the machine and a rework of the brush holder assembly. Thus, it would be desirable to have a brush holder assembly that eliminates any possibility of brushes being assembled incorrectly.

BRIEF DESCRIPTION OF THE INVENTION

The present invention improves safety during the brush retraction process, eliminates all possibility for brushes to be assembled incorrectly and unreliably by providing a mistake proof design, reduces the number of parts, and reduces overall brush holder assembly cost. The present invention provides an improved brush assembly that can be safely released, retracted, and replaced, while maintaining machine operation at synchronous speed and rated load. The present invention simplifies brush box manufacture and cost by eliminating the elongated machined slots in the brush box sides required in prior art design brush assemblies for single brush holders used for the free movement of the holding clip.

The brush holder assembly of the present invention includes a spring biased hook pin and a block glued or otherwise affixed to the top of a carbon brush and containing a slotted hole large enough to contain the hook pin, but not so large so as to cause the block to detach from the carbon brush, or fail mechanically. The hook pin acts as a mistake proof latching mechanism, which is assembled into the block as the block is being secured to the top of the brush. The glue is selected to be compatible with the carbon brush composite and has been tested under several environmental conditions for maintaining adequate mechanical strength for brush retraction. The brush assembly is completed by inserting the open hook pin through the spring assembly and locking it in place with a hook end of the hook pin. The spring assembly and brush holder are mounted in the rectangular portion of a brush box and locked in place using an inclined slot.

DETAILED DESCRIPTION OF THE INVENTION

The present invention is directed to a brush holder assembly that, by design, cannot be assembled incorrectly, that includes a reduced number of parts so as to reduce the cost of the design, and that can be safely retracted while a dynamoelectric machine is operating.

Figure 1:
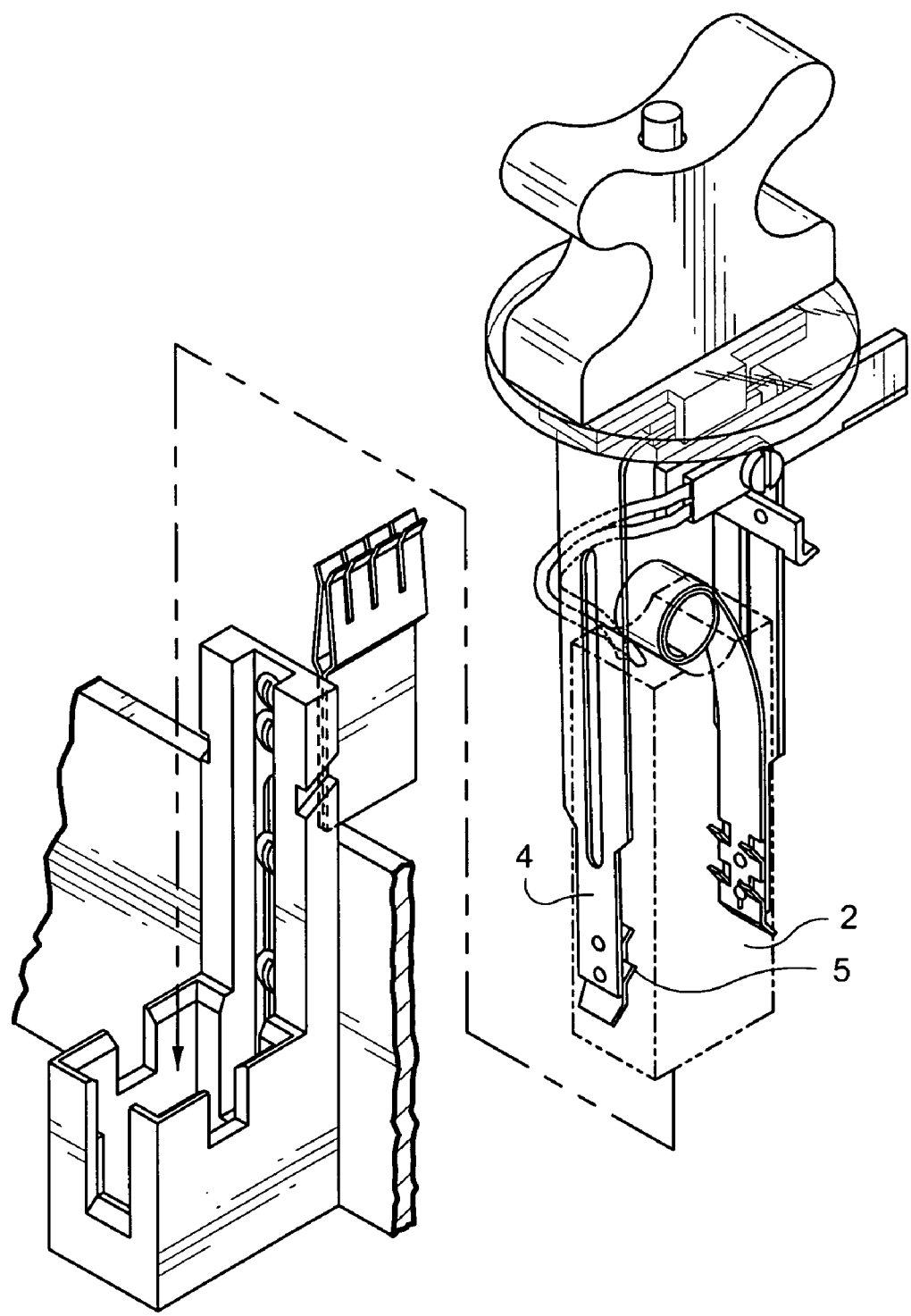
FIG. 1 is an exploded, perspective view of a prior art single brush holder assembly.
Figure 2A:
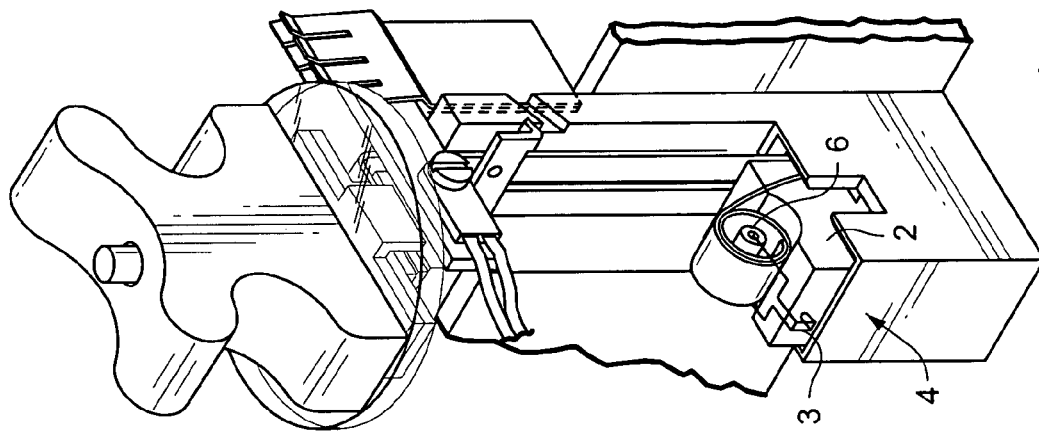
FIGS. 2A and 2B are perspective views of another prior art single brush holder assembly in two different positions as a result of brush wear.
Figure 2B:
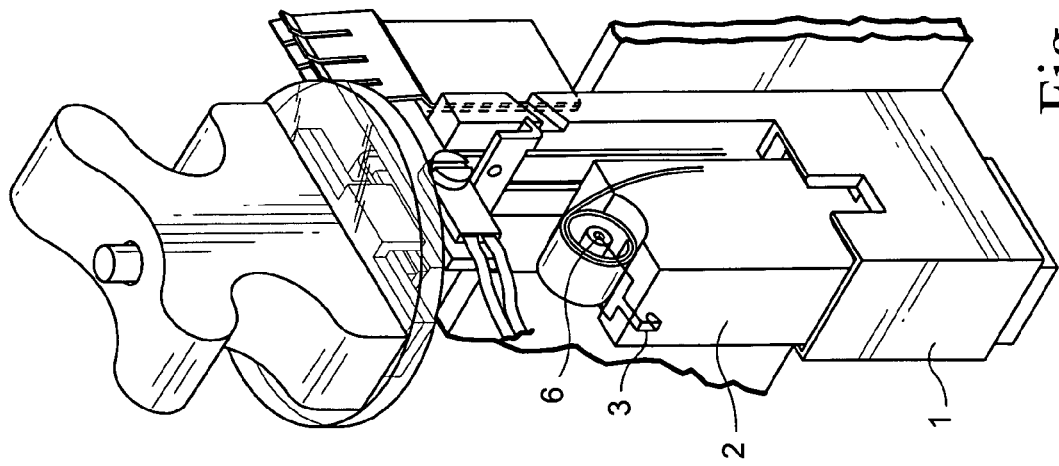
Figure 3A:
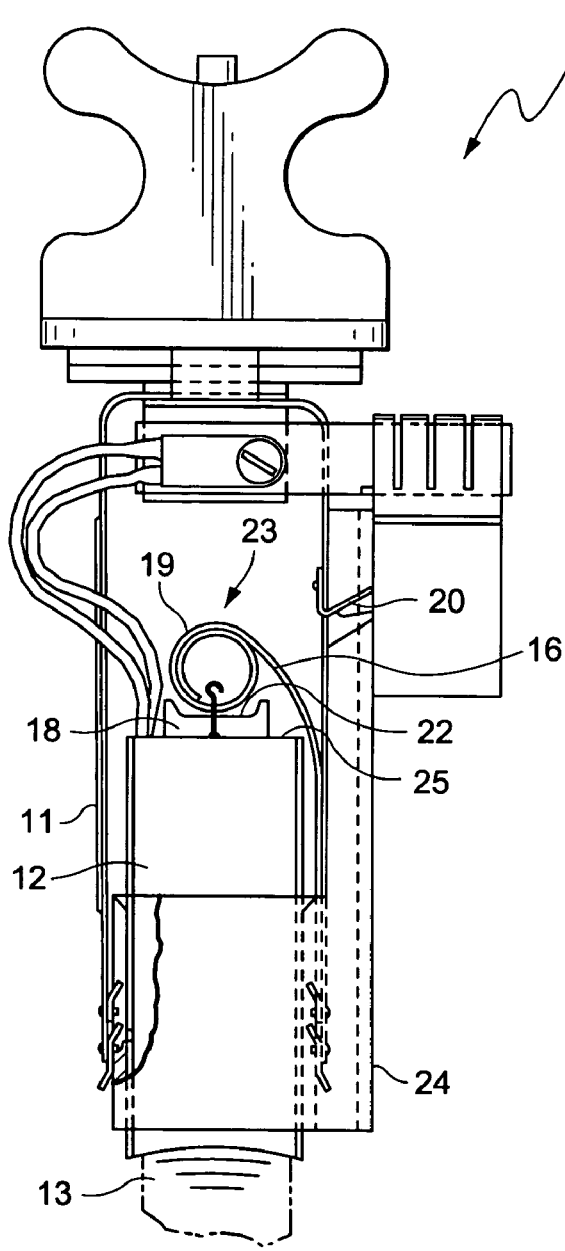
FIG. 3A is a cross-sectional view of the brush holder assembly of the present invention showing the hook pin and block arrangement used to hold to the top of a brush the spring exerting a radial pressure on the brush.
Figure 3B:
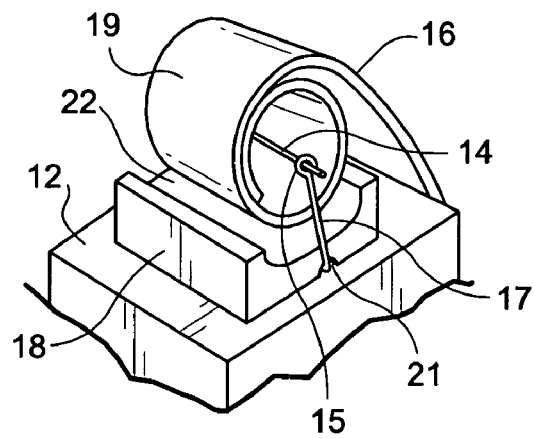
FIG. 3B is a partial perspective view of the brush hook and block arrangement used by the present invention to hold to the top of a brush the spring exerting a radial pressure on the brush.

As noted above, FIG. 3A is a cross-sectional view of the brush holder assembly of the present invention showing the hook pin and block arrangement used to hold to the top of a brush the spring exerting a radial pressure on the brush, while FIG. 3B is a partial perspective view of hook pin and block arrangement.

Referring to FIGS. 3A and 3B, the brush holder assembly 10 of the present invention includes a brush holder 11 and a brush 12 mounted within brush holder 11. In operation, brush 12 transfers current to a rotating contact, such as a slip ring 13, that supplies excitation power to the dynamoelectric machine. Brush 12 is slidable radially inward toward the surface of rotating slip ring 13, and is maintained on the rotating surface of slip ring 13 by means of a constant pressure exerted by spring 16 mounted on brush holder 11.

Affixed to the top 25 of brush 12 is a block 18 with a semicircular indentation 22 which cradles a coiled portion 19 of spring 16. Preferably, block 18 is glued to the top 25 of brush 12. Preferably, the top 25 of brush 12 is substantially flat to accommodate block 18. The glue or other adhesive used to secure block 18 to brush 12 is selected to be compatible with the carbon composite used to form brush 12 and to provide adequate mechanical strength for holding block 18 to brush 12 under various environmental conditions. It should be noted that block 18 may also be pinned, screwed, dovetailed, or otherwise suitably attached to the top 25 of brush 12.

A brush and block assembly with block 18 glued to the top 25 of brush 12 using a proprietary adhesive formula was purchased from National Electric Carbon, Inc. Block 18 is composed of an insulator material that is preferably a rubber composite. A block 18 formed from a proprietary rubber composite material was purchased from National Electric Carbon, Inc.

Block 18 also includes a slotted hole 21 in which a hook pin 17 that engages spring 16 is preferably partially inserted. It should be noted that hook pin 17 can alternatively be inserted through a hole in carbon brush 12 or epoxy glued in place to block 18. Slotted hole 21 is large enough receive hook pin 17, but not so large as to cause block 18 to detach from the top 25 of brush 12 or fail mechanically. Hook pin 17 is inserted into slotted hole 21 of block 18 just as block 18 is secured to the top 25 of brush 12.

Figure 3C:
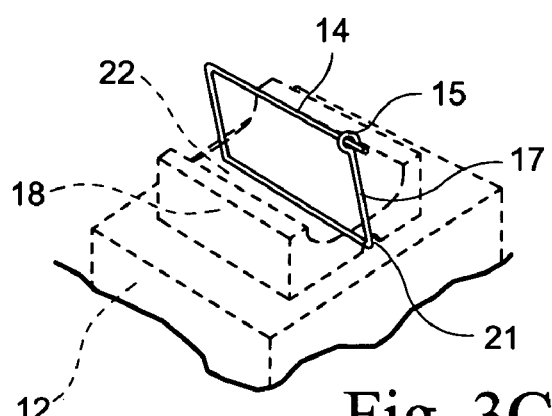
FIG. 3C is a partial perspective view of the hook pin used by the present invention to hold to a block glued to the top of a brush the spring exerting a radial pressure on the brush, the block and top of the brush being depicted in phantom to show the interaction between the hook pin and block.

Referring further to FIG. 3C, hook pin 17 is preferably in the form of a loop that terminates at a first end in the shape of a substantially straight pin 14 and at a second end in the shape of a hook-shaped loop 15. Preferably, hook pin 17 is in the form of a loop that is substantially rectangular in shape. Straight pin 14 is first inserted through the center of coiled portion 19 of spring 16 and then latched into hook-shaped loop 15 so as to lock coiled portion 19 of spring 16 in indentation 22 of block 18, as shown in FIG. 3B. Preferably, hook pin 17 is formed from a spring-biased metal to facilitate insertion of the straight pin first end 14 into the hook-shaped loop second end 15. It should be noted that hook pin 17 is preferably formed from piano wire, but that any suitable metal alloy or plastic composite can be used to form hook pin 17. It should be further noted that an electrical plastic wire tie or a twist tie could be used in place of the hook pin 17.

Once the straight pin 14 of hook pin 17 is inserted through the coiled portion 19 of spring 16 and then locked into the hook-shaped loop 15 of hook pin 17, to thereby lock spring 16 in place, this spring holder assembly 23, brush 12 and brush holder 11 are then inserted into the rectangular portion of a brush box 24 and locked in place using the inclined slots 20 shown in FIG. 3A. Because brush 12 is maintained on the rotating surface of slip ring 13 by means of the constant pressure exerted on brush 12 by spring 16, brush 12 wears down over time, so as to ultimately require replacement.

Figure 4A:
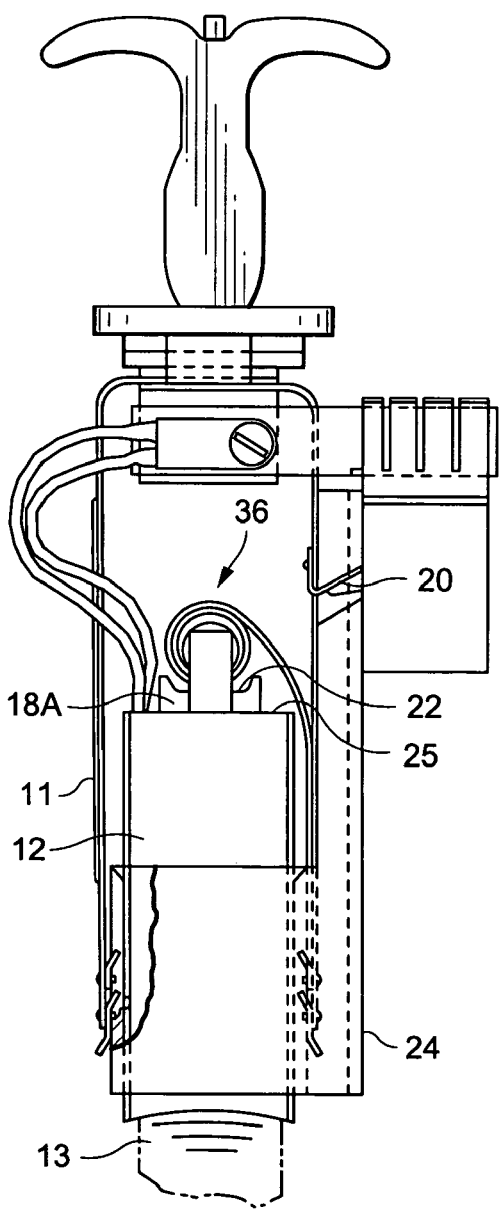
FIG. 4A is a cross-sectional view of an alternative embodiment of the brush holder assembly of the present invention showing the spool assembly and block arrangement used to hold to the top of a brush the spring exerting a radial pressure on the brush.
Figure 4B:
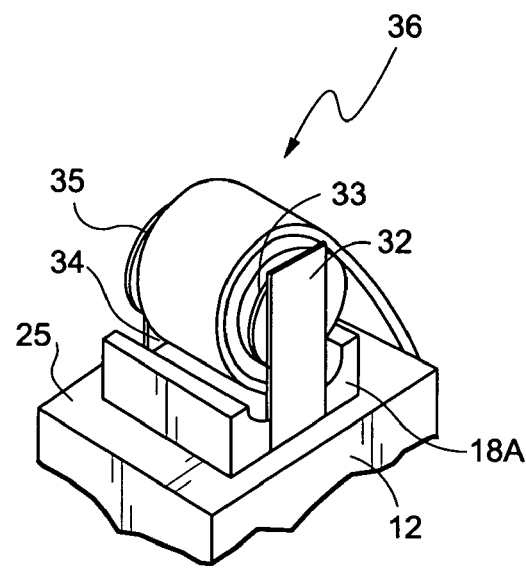
FIG. 4B is a partial perspective view of the spool assembly and block arrangement used by the present invention to hold to the top of a brush the spring exerting a radial pressure on the brush.

FIG. 4A is a cross-sectional view of an alternative embodiment of the brush holder assembly of the present invention showing a spool and block arrangement 36 used to hold spring 16 to the top 25 of brush 12. FIG. 4B is a partial perspective view of spool and block arrangement 36, while FIG. 4C is a partial perspective view of the spool assembly 30, in which block 18A and the top of brush 12 are depicted in phantom to show the interaction between the spool assembly 30 and block 18A.

Block 18A includes a slotted indentation 31 in which spool assembly 30 that engages spring 16 is preferably partially inserted. It should be noted that spool assembly 30 can alternatively be epoxy glued to block 18A. Indentation 31 is large enough receive a portion of spool assembly 30, but not so large as to cause block 18A to detach from the top 25 of brush 12 or fail mechanically. Spool assembly 30 is inserted into indentation 31 of block 18A just as block 18A is secured to the top 25 of brush 12.

Figure 4C:
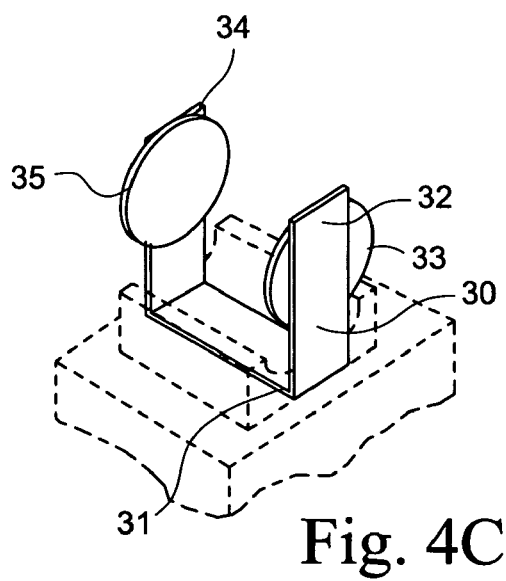
FIG. 4C is a partial perspective view of the spool assembly used by the present invention to hold to a block glued to the top of a brush the spring exerting a radial pressure on the brush, the block and top of the brush being depicted in phantom to show the interaction between the spool assembly and block.

Referring specifically to FIG. 4C, spool assembly 30 is made from substantially flat, ribbon-like metal that is formed preferably and substantially into the shape of a "U" with a first upright end 32 that supports a first spool holder 33 and a second upright end 34 that supports a second spool holder 35. First spool holder 33 and second spool holder 35 each engage and support an end of coiled portion 19 of spring 16 so as to lock coiled portion 19 of spring 16 in indentation 22A of block 18A, as shown in FIG. 4B. Preferably, spool assembly 30 is formed from a spring-biased metal to facilitate insertion of coiled portion 19 between first spool holder 33 and second spool holder 35.

Once coiled portion 19 of spring 16 is inserted between first spool holder 33 and second spool holder 35, to thereby lock spring 16 in place, this spring holder assembly 36, brush 12 and brush holder 11 are then inserted into the rectangular portion of a brush box 24 and locked in place using the inclined slots 20 shown in FIG. 4A.

The brush holder assembly of the present invention can be used on new generators and as replacement parts for generators already in service. And although the brush holder assembly of the present invention has been depicted as a single brush holder assembly, it should be noted that the brush holder assembly of the present invention can be used as part of multiple or magazine type brush holder assemblies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush holder assembly comprising:
   a brush holder,
   a brush inserted into the brush holder,
   a block attached to the top of the brush,
   a spring engaging the block so as to apply a pressure to the block and brush, and
   a hook pin engaging the spring and the block so as to hold the spring on the block.

2. The brush holder assembly of claim 1, wherein a coiled portion of the spring is cradled on the block.

3. The brush holder assembly of claim 2, wherein the block includes a semi-circular indentation that cradles the coiled portion of the spring.

4. The brush holder assembly of claim 1, wherein the block includes a slotted hole for containing a portion of the hook pin.

5. The brush holder assembly of claim 1, wherein the hook pin is a loop terminating at a first end in a substantially straight pin and terminating at a second end in a hook-shaped loop in which the straight pin first end can be inserted.

6. The brush holder assembly of claim 5, wherein the hook pin is formed from a spring-biased metal to facilitate insertion of the straight pin first end into the hook-shaped loop second end.

7. The brush holder assembly of claim 5, wherein the hook pin is a substantially rectangular-shaped loop.

8. The brush holder assembly of claim 1, wherein the hook pin is formed from a material selected from the group consisting of a metal alloy and a plastic composite.

9. The brush holder assembly of claim 1, wherein the hook pin is formed from piano wire.

10. The brush holder assembly of claim 1, wherein the block is glued to the top of the brush.

11. The brush holder assembly of claim 1, wherein the block is pinned to the top of the brush.

12. The brush holder assembly of claim 1, wherein the block is screwed to the top of the brush.

13. The brush holder assembly of claim 1, wherein the block is dovetailed to the top of the brush.

14. The brush holder assembly of claim 1, wherein the block is formed from a rubber composite material.

15. A brush holder assembly comprising:
    a brush holder,
    a brush inserted into the brush holder,
    a block glued to the top of the brush,
    a spring including a coiled portion engaging the top of block so as to apply a pressure to the block and brush through the block, and
    a hook pin engaging the coil portion of the spring and being inserted through a slot in the block so as to hold the coil portion of the spring on the block.

16. The brush holder assembly of claim 15, wherein the block includes a semi-circular indentation that cradles the coiled portion of the spring.

17. The brush holder assembly of claim 15, wherein the hook pin is a loop terminating at a first end in a substantially straight pin and terminating at a second end in a hook-shaped loop in which the straight pin first end can be inserted.

18. The brush holder assembly of claim 17, wherein a portion of the hook pin between the first and second ends is inserted in the slotted hole in the block.

19. The brush holder assembly of claim 17, wherein the hook pin is formed from a spring-biased metal to facilitate insertion of the straight pin first end into the hook-shaped loop second end.

20. The brush holder assembly of claim 14, wherein the hook pin is a substantially rectangular-shaped loop.

21. A brush holder assembly comprising:
    a brush holder,
    a brush inserted into the brush holder,
    a block attached to the top of the brush,
    a spring engaging the block so as to apply a pressure to the block and brush, and
    a spool assembly engaging the spring and the block so as to hold the spring on the block.

22. The brush holder assembly of claim 21, wherein the block includes a semi-circular indentation that cradles a coiled portion of the spring.

23. The brush holder assembly of claim 21, wherein the block includes a slotted indentation for containing a portion of the spool assembly.

24. The brush holder assembly of claim 21, wherein the spool assembly is made from substantially flat, ribbon-like metal that is formed substantially into the shape of a "U".

25. The brush holder assembly of claim 24, wherein the spool assembly includes a first upright end that supports a first spool holder and a second upright end that supports a second spool holder.

26. The brush holder assembly of claim 25, wherein the first spool holder and the second spool holder each engage and support an end of the coiled portion of the spring so as to lock the coiled portion of the spring in an indentation of the block.

27. The brush holder assembly of claim 26, wherein the spool assembly is formed from a spring-biased metal to facilitate insertion of the coiled portion between the first spool holder and the second spool holder.

* * * * *